United States Patent
Cho et al.

(10) Patent No.: US 10,061,445 B2
(45) Date of Patent: Aug. 28, 2018

(54) TOUCH INPUT DEVICE

(71) Applicant: HiDeep Inc., Gyeonggi-do (KR)

(72) Inventors: Byungduck Cho, Gyeonggi-do (KR); Seyeob Kim, Gyeonggi-do (KR)

(73) Assignee: HiDeep Inc. (KR)

( * ) Notice: Subject to any disclaimer, the term of this patent is extended or adjusted under 35 U.S.C. 154(b) by 328 days.

(21) Appl. No.: 14/623,714

(22) Filed: Feb. 17, 2015

(65) Prior Publication Data

US 2015/0234498 A1    Aug. 20, 2015

(30) Foreign Application Priority Data

Feb. 19, 2014    (KR) .................. 10-2014-0019107

(51) Int. Cl.
*G06F 3/044*    (2006.01)
(52) U.S. Cl.
CPC .................... *G06F 3/044* (2013.01)
(58) Field of Classification Search
CPC ...... G06F 3/044; G06F 3/0416; G06F 3/0412; G06F 3/045
USPC ....................... 345/174; 178/18.06
See application file for complete search history.

(56) References Cited

U.S. PATENT DOCUMENTS

| | | | | |
|---|---|---|---|---|
| 9,001,066 B2* | 4/2015 | Mohindra | ............... | G06F 3/044 345/173 |
| 9,357,045 B2* | 5/2016 | Oishi | ...................... | H04M 1/23 |
| 2009/0167713 A1* | 7/2009 | Edwards | ................. | G06F 3/044 345/173 |
| 2010/0156805 A1* | 6/2010 | Brand | ................... | G06F 3/0416 345/173 |
| 2010/0321214 A1* | 12/2010 | Wang | .................... | G06F 3/0416 341/20 |
| 2012/0050216 A1* | 3/2012 | Kremin | ................. | G06F 3/0416 345/174 |
| 2012/0092350 A1* | 4/2012 | Ganapathi | .......... | G02B 26/0833 345/501 |
| 2012/0113071 A1* | 5/2012 | Kawaguchi | ............. | G06F 3/044 345/204 |

(Continued)

FOREIGN PATENT DOCUMENTS

| | | |
|---|---|---|
| JP | 2012103797 | 5/2012 |
| KR | 101338285 | 7/2013 |
| KR | 1020130094495 | 8/2013 |

OTHER PUBLICATIONS

Corresponding Office Action issued by the KIPO dated Jun. 30, 2015.

*Primary Examiner* — Amare Mengistu
*Assistant Examiner* — Jennifer Zubajlo
(74) *Attorney, Agent, or Firm* — The Belles Group, P.C.

(57) ABSTRACT

A touch input device may be provided that includes: a touch sensor panel comprising n number of drive electrodes, m number of receiving electrodes, and a plurality of node capacitors which are formed by the drive electrodes and the receiving electrodes; a driving part which applies a driving signal to the drive electrode; a data processor which receives a signal including information on a capacitance of the node capacitor through the receiving electrode and detects touch information on the touch sensor panel; and a controller which controls the driving part to apply the driving signal to k number of the drive electrodes of n number of the drive electrodes in a first drive mode. The "n", "m", and "k" are natural numbers greater than 2 and "k" is less than "n".

18 Claims, 4 Drawing Sheets

(56) References Cited

U.S. PATENT DOCUMENTS

| | | | | |
|---|---|---|---|---|
| 2013/0127757 A1* | 5/2013 | Mann | G06F 3/041 | 345/173 |
| 2013/0215049 A1* | 8/2013 | Lee | G06F 3/0416 | 345/173 |
| 2013/0225072 A1* | 8/2013 | Fuller | G06F 3/044 | 455/41.1 |
| 2014/0267129 A1* | 9/2014 | Rebeschi | G06F 3/0418 | 345/174 |
| 2015/0085205 A1* | 3/2015 | Chen | G06F 3/044 | 349/12 |
| 2015/0170610 A1* | 6/2015 | Kurasawa | G09G 5/18 | 345/174 |

\* cited by examiner

Fig. 3a

|  RX1 | RX2 | RX3 |     |
|------|-----|-----|-----|
|  3   | 10  | 3   | TX1 |
|  10  | 100 | 10  | TX2 |
|  3   | 10  | 3   | TX3 |

Fig. 3b

|  RX1 | RX2 | RX3 |     |
|------|-----|-----|-----|
|  8   | 8   | 2   | TX1 |
|  50  | 50  | 5   | TX2 |
|  8   | 8   | 2   | TX3 |

Fig. 4a

|  RX1 | RX2 | RX3 |     |
|------|-----|-----|-----|
| 10   | 30  | 10  | TX1 |
| 30   | 100 | 30  | TX2 |
| 10   | 30  | 10  | TX3 |

Fig. 4b

| RX1 | RX2 | RX3 |     |
|-----|-----|-----|-----|
| 25  | 25  | 8   | TX1 |
| 50  | 50  | 10  | TX2 |
| 25  | 25  | 8   | TX3 |

TOUCH INPUT DEVICE

CROSS REFERENCE TO RELATED APPLICATIONS

Priority is claimed under 35 U.S.C. § 119 to Korean Patent Application No.: 10-2014-0019107, filed Feb. 19, 2014, the disclosure of which is incorporated herein by reference in its entirety.

FIELD OF THE INVENTION

The present invention relates to a touch input device, and more particularly to a touch input device which provides high resolution and has relatively low power consumption.

BACKGROUND OF THE INVENTION

A variety of input devices are being used to operate a computing system. For example, input devices like a button, a key, a joystick and a touch screen are being used. Since the touch screen is easy and simple to operate, the touch screen is increasingly being used in operation of the computing system.

The touch screen may include a touch sensor panel which may be a transparent panel including a touch-sensitive surface. Such a touch sensor panel is attached to the front side of a display panel, and then the touch-sensitive surface may cover the visible side of the display panel. The touch screen allows a user to operate the computing system by simply touching the screen by a finger, etc. In general, the touch screen recognizes the touch on the panel and touch position, and then the computing system analyzes the touch and performs operations in accordance with the analysis.

The touch sensor panel makes it possible to display the movement of an object on the touch screen when a variety of the objects like finger, stylus pen, etc., approach and/or touch the touch sensor panel. Here, it is necessary to provide a touch input device which detects and displays the movement of the object with high resolution according to needs and has low power consumption.

SUMMARY OF THE INVENTION

One embodiment is a touch input device that includes: a touch sensor panel comprising n number of drive electrodes, m number of receiving electrodes, and a plurality of node capacitors which are formed by the drive electrodes and the receiving electrodes; a driving part which applies a driving signal to the drive electrode; a data processor which receives a signal including information on a capacitance of the node capacitor through the receiving electrode and detects touch information on the touch sensor panel; and a controller which controls the driving part to apply the driving signal to k number of the drive electrodes of n number of the drive electrodes in a first drive mode. Here, the "n", "m", and "k" are natural numbers greater than 2 and "k" is less than "n".

Another embodiment is a touch input device that includes: a touch sensor panel comprising n number of drive electrodes, m number of receiving electrodes, and a plurality of node capacitors which are formed by the drive electrodes and the receiving electrodes; a driving part which applies a driving signal to the drive electrode; a data processor which receives a signal including information on a capacitance of the node capacitor through the receiving electrode and detects touch information on the touch sensor panel; and a controller which controls the data processor to receive the signal through s number of the receiving electrodes of m number of the receiving electrodes and to detect the touch information in a first drive mode. Here, the "n", "m", and "s" are natural numbers greater than 2 and "s" is less than "m".

Further another embodiment is a touch input device that includes: a touch sensor panel comprising n number of drive electrodes, m number of receiving electrodes, and a plurality of node capacitors which are formed by the drive electrodes and the receiving electrodes; a driving part which applies a driving signal to the drive electrode; a data processor which receives a signal including information on a capacitance of the node capacitor through the receiving electrode and detects touch information on the touch sensor panel; and a controller which controls the driving part to apply the driving signal in a first drive mode such that at least two of n number of the drive electrodes are simultaneously driven. Here, the "n" and "m" are natural numbers greater than 2.

BRIEF DESCRIPTION OF THE DRAWINGS

FIGS. 3a and 3b show a value of a capacitance change amount when the touch sensor panel is touched by a stylus pen in accordance with the embodiment of the present invention; and FIGS. 4a and 4b show a value of the capacitance change amount when the touch sensor panel is touched by a finger in accordance with the embodiment of the present invention.

DETAILED DESCRIPTION OF THE INVENTION

Figure 1:
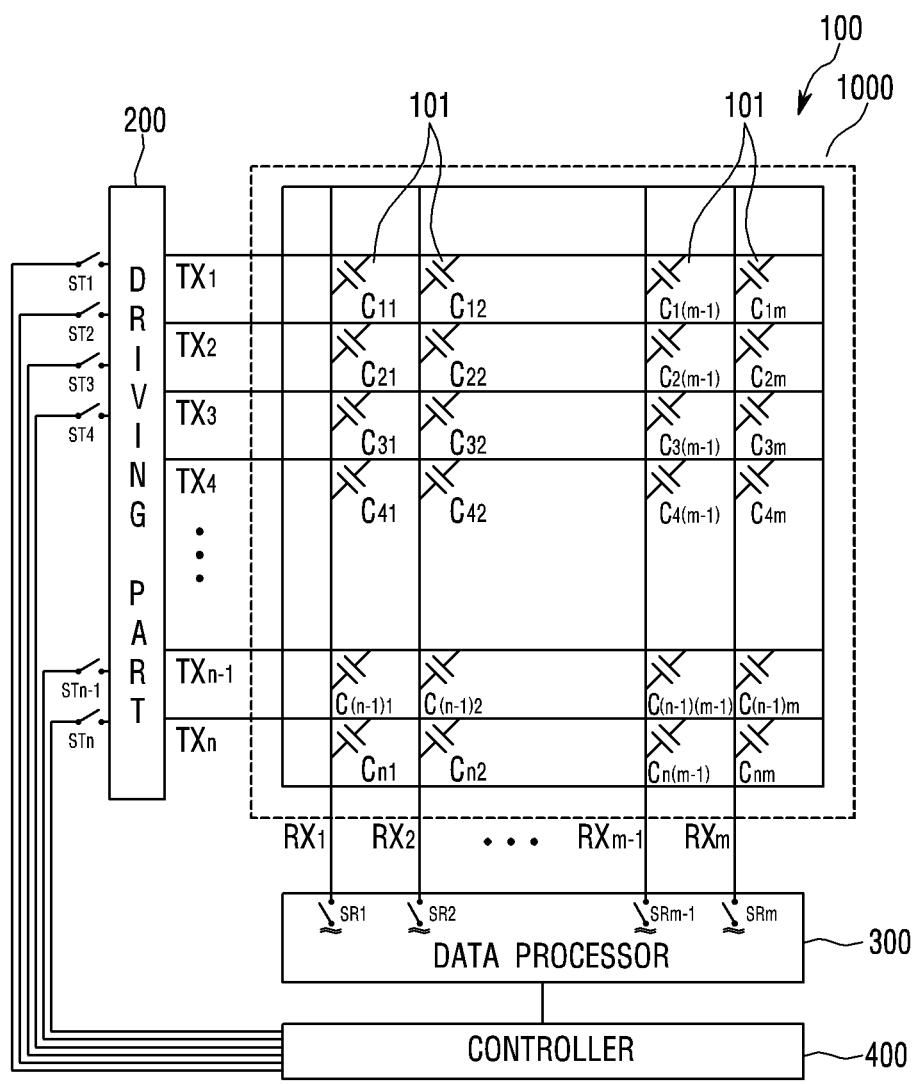
FIG. 1 is a structure view of a touch input device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a touch input device according to an embodiment of the present invention will be described with reference to the accompanying drawings.

FIG. 1 is a structure view of a touch input device 1000 according to an embodiment of the present invention. Referring to FIG. 1, the touch input device 1000 according to the embodiment of the present invention may include a touch sensor panel 100, a driving part 200, and a data processor 300. The touch sensor panel 100 includes n number of drive electrodes TX1 to TXn, m number of receiving electrodes RX1 to RXm, and a plurality of node capacitors C11 to Cnm formed by the drive electrodes and the receiving electrodes. The driving part 200 applies a driving signal to the drive electrodes TX1 to TXn. The data processor 300 receives a signal including information on the capacitance of the node capacitors C11 to Cnm through the receiving electrodes RX1 to RXm and detects touch information on the touch sensor panel.

In the embodiment of the present invention, the touch information may include whether a touch object has touched the touch sensor panel 100 or not, a touch position, a touch area, and a touch pressure, etc.

As shown in FIG. 1, the touch sensor panel 100 may include n number of the drive electrodes TX1 to TXn, and m number of the receiving electrodes RX1 to RXm. The touch sensor panel 100 of the touch input device 1000 according to the embodiment of the present invention may be disposed on or inside a display panel (not shown). The display panel in which the touch sensor panel 100 of the touch input device 1000 according to the embodiment of the present invention may be formed may be included in a liquid crystal display (LCD), an organic light emitting diode (OLED), etc.

While the following description and accompanying drawings show that n number of the drive electrodes TX1 to TXn and m number of the receiving electrodes RX1 to RXm form an orthogonal array, the present invention is not limited to this. N number of the drive electrodes TX1 to TXn and m number of the receiving electrodes RX1 to RXm has an array of arbitrary dimension, for example, a diagonal array, a concentric array, a 3-dimensional random array, etc., and an array obtained by the application of them. Here, "n" and "m" are natural numbers greater than 2 and may be the same as each other or may have different values. For example, the values of "n" and "m" may be determined according to the size of the touch sensor panel 100 and/or the resolution provided by the touch sensor panel 100.

As shown in FIG. 1, n number of the drive electrodes TX1 to TXn and m number of receiving electrodes RX1 to RXm may be arranged to cross each other. The drive electrode TX may include a plurality of drive electrodes TX1 to TXn extending in a first axial direction. The receiving electrode RX may include a plurality of receiving electrodes RX1 to RXm extending in a second axial direction crossing the first axial direction.

In the touch sensor panel 100 according to the embodiment of the present invention, n number of the drive electrodes TX1 to TXn and m number of receiving electrodes RX1 to RXm may be formed in the same layer. For example, n number of the drive electrodes TX1 to TXn and m number of receiving electrodes RX1 to RXm may be formed on the same side of an insulation layer (not shown). Also, n number of the drive electrodes TX1 to TXn and m number of receiving electrodes RX1 to RXm may be formed in the different layers. For example, n number of the drive electrodes TX1 to TXn and m number of receiving electrodes RX1 to RXm may be formed on both sides of one insulation layer (not shown) respectively, or n number of the drive electrodes TX1 to TXn may be formed on a side of a first insulation layer (not shown) and m number of receiving electrodes RX1 to RXm may be formed on a side of a second insulation layer (not shown) different from the first insulation layer.

Each node capacitor 101 of the touch sensor panel 100 may be formed at a crossing of one drive electrode TX and one receiving electrode RX. While FIG. 1 shows that n number of the drive electrodes TX1 to TXn and m number of receiving electrodes RX1 to RXm are indicated respectively by a line, the drive electrodes and receiving electrodes may be actually implemented by an electrode pattern. Also, the drive electrodes TX1 to TXn and receiving electrodes RX1 to RXm may be implemented to have mutually different widths.

In the embodiment of the present invention, the drive electrodes TX1 to TXn and receiving electrodes RX1 to RXm may be made of a transparent conductive material (for example, indium tin oxide (ITO) or antimony tin oxide (ATO)), or the like. However, this is just an example. The drive electrode TX and the receiving electrode RX may be also made of another transparent conductive material or an opaque conductive material like copper, etc.

The drive part 120 according to the embodiment of the present invention may apply a driving signal to the drive electrodes TX1 to TXn. In the touch input device 1000 according to the embodiment of the present invention, one driving signal may be sequentially applied at a time from the first drive electrode TX1 to the n-th drive electrode TXn. The driving signal may be applied again repeatedly. Here, through the receiving electrodes RX1 to RXm, the data processor 300 receives sequentially from the first receiving electrode RX1 to the m-th receiving electrode RXm a signal including information on a mutual capacitance C101 between the receiving electrodes RX1 to RXm and the drive electrodes TX1 to TXn to which the driving signal has been applied, thereby sensing the change amount of the corresponding capacitance. As such, the process of sensing the driving signal applied from the first drive electrode TX1 to the n-th drive electrode TXn through the receiving electrodes RX1 to RXm can be referred to as a process of scanning the touch sensor panel 100. When each scan is performed, a procedure of sequentially applying the driving signal to the first drive electrode TX1 to the n-th drive electrode TXn and a procedure of receiving the signal from the first receiving electrode RX1 to the m-th receiving electrode RXm may be repeated.

As described above, the capacitance C101 with a predetermined value is generated at each crossing of the drive electrode TX and the receiving electrode RX. When the object like a finger approaches and/or touches the touch sensor panel 100, the value of the capacitance may be changed. The data processor 300 senses such an electric characteristic change, thereby sensing whether the object touches the surface of the touch sensor panel 100 or not and/or the touch position. For example, the data processor 300 is able to sense whether or not the touch has occurred on the touch sensor panel 100 comprised of a two-dimensional plane consisting of the first axis and the second axis.

More specifically, when the touch occurs on the touch sensor panel 100, the drive electrode TX to which the driving signal has been applied is detected, so that the position of the second axial direction of the touch can be detected. Likewise, when the touch occurs on the touch sensor panel 100, the capacitance change is detected from the reception signal received through the receiving electrode RX, so that the position of the first axial direction of the touch can be detected. In the present specification, the touch on the touch sensor panel 100 may include not only the case where the object directly touches the touch sensor panel 100 but also the case where the object is close enough to the touch sensor panel 100 to cause the change of the capacitance of the node capacitor 101.

In the touch input device 1000 according to the embodiment of the present invention, the driving signal applied to the drive electrodes TX1 to TXn by the driving part 200 is coupled by the mutual capacitance of the corresponding node capacitor 101 and is detected through the receiving electrodes RX1 to RXm. As shown in FIG. 1, the touch input device 1000 according to the embodiment of the present invention may include the data processor 300 receives the signal including the information on the capacitance of the node capacitors C11 to Cnm through the receiving electrodes RX1 to RXm and detects the touch information. The data processor 300 will be described in more detail with reference to FIG. 2.

The touch input device 1000 according to the embodiment of the present invention may further include a controller 400. The controller 400 according to the embodiment of the present invention controls the driving part 200 and/or the data processor 300 with the distinction of a first drive mode for detect the touch on the surface of the touch sensor panel 100 with relatively low resolution and a second drive mode for detect the touch on the surface of the touch sensor panel 100 with relatively high resolution.

For instance, the controller 400 according to a first embodiment may control the driving part 200 to apply the driving signal to only k number of the drive electrodes of n number of the drive electrodes TX1 to TXn in the first drive mode. In the first embodiment of the present invention, "k" is a natural number greater than 2 and may be less than "n". The controller 400 according to the first embodiment is configured to detect the touch of the object on the surface of the touch sensor panel 100 by using only some drive electrodes TX of n number of the drive electrodes TX1 to TXn in the first drive mode. When each scan is performed in the first drive mode, the driving signal is sequentially applied to k number of the drive electrodes and the driving signal is not applied to (n-k) number of the drive electrodes.

In FIG. 1, in the first drive mode, only the odd numbered drive electrodes (TX1, TX3, . . . ) can be driven by the driving part 200. The driving signal may not be applied to the other even numbered drive electrodes (TX2, TX4, . . . ). In FIG. 1, switches ST1 to STn are positioned between the controller 400 and the driving part 200 corresponding to the drive electrodes TX1 to TXn. The even numbered switches (ST2, ST4, . . . ) may be in an open state in the first drive mode. The odd numbered switches (ST1, ST3, . . . ) may be in a closed state in the first drive mode. However, this is just an example. The controller 400 may control such that the driving signal is not applied to the even numbered drive electrodes (TX2, TX4, . . . ) in the first drive mode without the configuration of the switches ST1 to STn shown in FIG. 1. Here, the operation of the driving part 200 will be described in detail in connection with FIG. 2. Also, the switches ST1 to STn may be included in the controller 400 or in the driving part 200.

Also, it is shown just as an example that the odd drive electrodes (TX1, TX3, . . . ) are driven in the first drive mode. It is enough as long as two adjacent drive electrodes (e.g., TX1 and TX3) of k number of the drive electrodes are spaced from each other and at least one (e.g., TX2) of the other undriven drive electrodes (TX2, TX4, . . . ) of n number of the drive electrodes TX1 to TXn is placed between the two adjacent electrodes. For example, it is possible that the even numbered drive electrodes (TX2, TX4, . . . ) is driven in the first drive mode by the driving part 200. Also, according to the embodiment, only one (e.g., 3a) of three consecutive adjacent drive electrodes (3a-2, 3a-1 and 3a, here, "a" is greater than 1) can be controlled to be driven in the first drive mode. Here, the drive electrodes to be driven in the first drive mode may be selected to have a uniform spaced distance among n number of the drive electrodes TX1 to TXn. This intends to provide a uniform resolution.

According to the first embodiment of the present invention, in the first drive mode, the controller 400 of the present invention may control such that the data processor 300 receives the signal including the information on the capacitance of the node capacitor through s number of the receiving electrodes of m number of the receiving electrodes RX1 to RXm and uses the signal to detect the touch information. In the embodiment of the present invention, "s" is a natural number greater than 2 and may be less than "m". The controller 400 according to the first embodiment of the present invention is configured to detect the touch of the object on the surface of the touch sensor panel 100 by using only some of m number of the receiving electrodes RX1 to RXm in the first drive mode. When each scan is performed in the first drive mode, the controller 400 is used for the data processor 300 to sequentially receive the signal from s number of the receiving electrodes and to obtain the touch information. The signal for the capacitance change may not be used through (m-s) number of the receiving electrodes.

In the first embodiment, the signal can be transmitted to the data processor 300 in the first drive mode only through the odd numbered receiving electrodes (RX1, RX3, . . . ). The signal from the other even numbered receiving electrodes (RX2, RX4, . . . ) is not used for the data processor 300 to detect the touch information. In FIG. 1, the data processor 300 includes switches SR1 to SRm connected to the receiving electrodes RX1 to RXm. In the first drive mode, the even numbered switches (SR2, SR4, . . . ) may be in an open state and the odd numbered switches (SR1, SR3, . . . ) may be in a closed state. However, this is just an example. The above-implementation may be changed according to the embodiment.

Also, it is shown just as an example that only the signal from the odd numbered receiving electrodes (RX1, RX3, . . . ) is processed in the first drive mode by the data processor 300. It is enough as long as two adjacent receiving electrodes (e.g., RX1 and RX3) of s number of the selected receiving electrodes are spaced from each other and at least one (e.g., RX2) of the other unselected receiving electrodes (RX2, RX4, . . . ) of m number of the receiving electrodes RX1 to RXm is placed between the two adjacent electrodes. For example, it is possible that the signal from the even numbered receiving electrodes (RX2, RX4, . . . ) is collected and processed in the first drive mode by the data processor 300. Also, according to the embodiment, in the first drive mode, only the signal from one (e.g., 3a) of three consecutive adjacent receiving electrodes (3a-2, 3a-1 and 3a, here, "a" is greater than 1) can be used for the data processor 300 to detect the touch information. Here, the drive electrodes to be driven in the first drive mode may be selected to have a uniform spaced distance among m number of the receiving electrodes RX1 to RXm. This intends to provide a uniform resolution.

For the purpose of detecting and representing the movement of the touch on the touch sensor panel 100 with higher resolution, the controller 400 according to the first embodiment of the present invention may control in the second drive mode in such a manner as to apply the driving signal to n number of the drive electrodes TX1 to TXn included in the touch sensor panel 100. Likewise, in the second drive mode, the data processor 300 may receive all of the signals from m number of the receiving electrodes RX1 to RXm and use the signals to detect the touch information. Here, the switches ST1 to STn and SR1 to SRm may be in a closed state.

Figure 2:
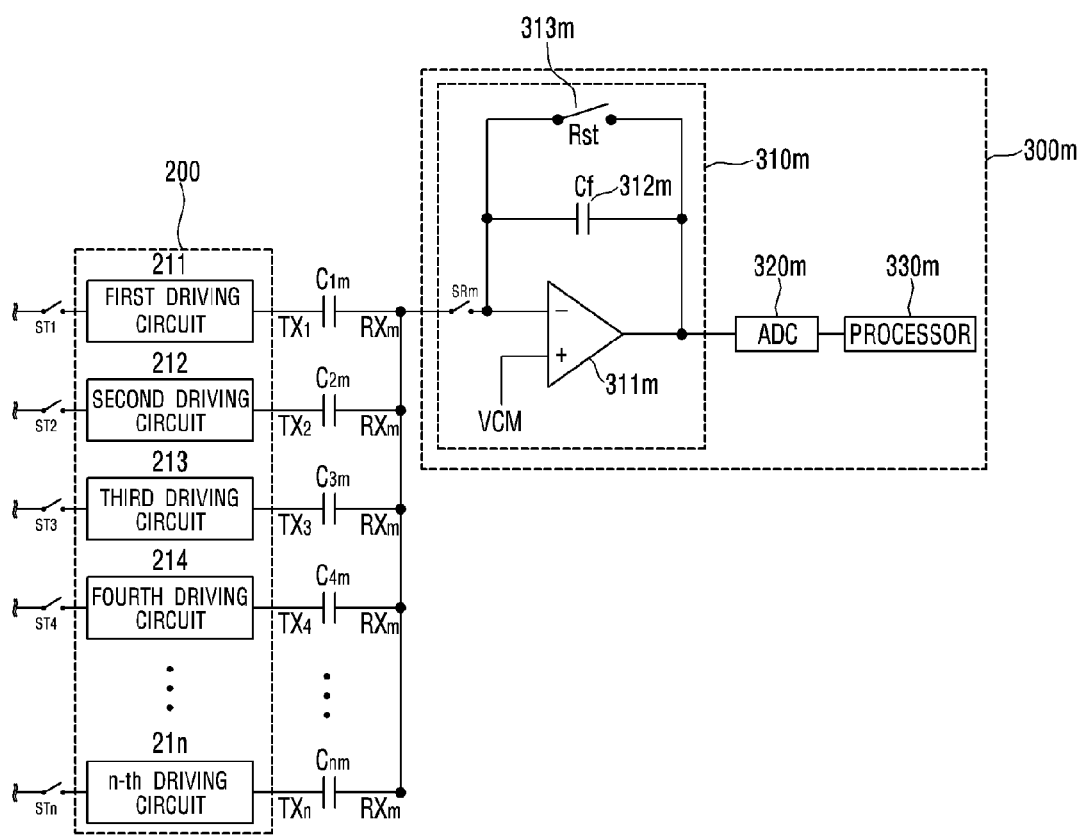
FIG. 2 is a circuit diagram showing a connection relationship among the node capacitor, driving part and data processor shown in FIG. 1.

FIG. 2 is a circuit diagram showing a connection relationship among the node capacitor 101, driving part 200 and data processor 300 shown in FIG. 1. Referring to FIG. 2, the driving part 200 may include n number of driving circuits 211 to 21n. N number of the driving circuits 211 to 21n are connected to n number of the drive electrodes TX1 TX2, TX3, TX4, . . . , TXn respectively and may transmit the driving signal. The data processor 300 may include m number of the data processing units 300m. Each of the data processing units senses the capacitances of the node capacitors C1m to Cnm and obtains the touch information. For convenience of description, FIG. 2 shows only that the capacitances of the node capacitors C11 to Cnm, which are transmitted through the m-th receiving electrode RXm, are sensed. Therefore, only the m-th data processing unit 300m of the plurality of data processing units is shown.

One end of the first node capacitor C11 is connected to the first driving circuit 211 through the first drive electrode TX1, and the other end of the first node capacitor C11 is connected to the m-th data processing unit 300m through the m-th receiving electrode RXm. Likewise, the second node capacitor C21 to the n-th node capacitor Cnm may be also connected to the driving part 200 and the m-th data processing unit 300m.

Also, the m-th data processing unit 300m includes, for example, a capacitance-voltage amplifier 310m and may integrate the signal including the information on the capacitances of the node capacitors C1m to Cnm, which have been received through the m-th receiving electrode RXm. The data integrated through the capacitance-voltage amplifier 310m may be converted into digital data through an ADC 320m. Later, the digital data is input to a processor 330m and is processed to obtain the touch information on the touch sensor panel 100.

The capacitance-voltage amplifier 310m according to the embodiment of the present invention may be configured to include an amplifier 311m and a capacitor 312m which is positioned between the input and output of the amplifier 311m, that is to say, is coupled to the feedback path. Also, the capacitance-voltage amplifier 310m may further include a reset switch 313m which is connected in parallel with the capacitor 312m. The reset switch 313m may reset the conversion from current to voltage that is performed by the capacitance-voltage amplifier 310m. The negative input terminal of the amplifier 311m may be connected to the m-th receiving electrode RXm and receive the signal including the information on the capacitance which is transmitted from the node capacitors C1m to Cnm.

In the first embodiment of the present invention, in the first drive mode, the switches (ST2, ST4, . . . ) connected to the driving circuits (212, 214, . . . ) corresponding to the even numbered drive electrodes (TX2, TX4, . . . ) may be in an open state, and the switches (ST1, ST3, . . . ) connected to the driving circuits (211, 213, . . . ) corresponding to the odd numbered drive electrodes (TX1, TX3, . . . ) may be in a closed state. Therefore, in the first drive mode, the second driving circuit 212 does not apply the driving signal to the second drive electrode TX2, and the even numbered driving circuits 21n including the fourth driving circuit 214 do not apply the driving signal to the corresponding drive electrodes (TX4, . . . , TXn). It is not necessarily required to position the switches ST1 to STn and to determine whether or not the driving signal is applied according to the opening and closing of the corresponding switch. According to the embodiment, the touch input device 1000 may be implemented without the switches ST1 to STn. Here, the controller 300 may just control such that the even numbered driving circuits (212, 214, . . . ) do not apply the driving signal to the corresponding drive electrodes (TX2, TX4, . . . ). The controller 400 is able to control k number of the driving circuits (211, 213, . . . ) such that performs the time-division between the other k number of the drive electrodes (TX1, TX3, . . . ) to be driven and the driving signal is sequentially applied to the drive electrodes (TX1, TX3, . . . ).

In the same manner, in the first drive mode, the switches (SR2, SR4, . . . connected between the even numbered receiving electrodes (RX2, RX4, . . . ) and the corresponding data processor 300 may be in an open state in the first drive mode. FIG. 2 shows that the switch SRm connected between the m-th receiving electrode RXm and the corresponding data processing unit 300m is in an open state (it is shown that "n" and "m" are even numbers in the present specification). Therefore, in the first drive mode, the signal from the even numbered receiving electrode RXm is not used for the data processor 300 to detect the touch information. The switch SRm is positioned between the data processing unit 300m and the corresponding receiving electrode RXm, so that it is not required to determine whether or not the reception signal is applied to the data processing unit 300m in accordance with the opening and closing of the corresponding switch. According to the embodiment, the touch input device 1000 may be implemented without the switch SRm. Here, the controller 300 may just control such that the even numbered data processing unit 300m is not operated. This can be applied to the data processing unit corresponding to the other even numbered receiving electrodes (RX2, RX4, . . . ) which have not been shown in FIG. 2.

The data processing unit 300m described with reference to FIG. 2 is just an example. According to the embodiment, various data processing units 300m may be used which are capable of detecting the touch on the touch sensor panel 100 by receiving the signal from the receiving electrode RX.

In the same manner, in the second drive mode requiring higher resolution than that of the first drive mode, the driving signal is applied to n number of the drive electrodes TX1 to TXn, and then all of m number of the data processing units connected to m number of the receiving electrodes RX1 to RXm receive the signal, so that the signal can be used to detect the touch on the touch sensor panel 100.

As described above, the touch input device 1000 according to the first embodiment of the present invention is able to operate with the distinction of the first drive mode and the second drive mode.

For example, in the first drive mode, only some of the drive electrodes TX included in the touch sensor panel 100 may be used to detect the touch. Also, in the first drive mode, only some of the receiving electrodes RX included in the touch sensor panel 100 may be used to detect the touch. Here, in the first drive mode, all of the drive electrodes TX and some of the receiving electrodes RX may be used to detect the touch, some of the drive electrodes TX and all of the receiving electrodes RX may be used to detect the touch, and some of the drive electrodes TX and some of the receiving electrodes RX may be used to detect the touch.

In the second drive mode, all of the drive electrodes TX and all of the receiving electrodes RX, which are included in the touch sensor panel 100, may be used to detect the touch. In the second drive mode, when the object touches the surface of the touch sensor panel 100, the movement of the touch can be detected and represented with high resolution. However, in this case, all of the drive electrodes TX should be driven and much power is required for integrating all of the signals from the all of the receiving electrodes RX and for processing the data.

Therefore, in the first embodiment of the present invention, when high resolution is not required, the touch input device 1000 is operated as described in the first drive mode, and thus, the power consumption can be reduced. Accordingly, according to the first embodiment of the present invention, according to needs, the touch on the touch sensor panel 100 can be detected with high resolution by driving the touch input device 1000 in the second drive mode. When the high resolution is not required, the touch input device 1000 is driven in the first drive mode, so that the power consumption can be reduced.

In the touch input device 1000 according to the first embodiment of the present invention, the controller 400 may recognize the first drive mode and the second drive mode through a selective input to the touch input device 1000. For example, the touch input device 1000 may be implemented to include a physical switch or button, etc., and to allow a user to select the first drive mode and the second drive mode according to needs. Also, an option for selecting the first drive mode and the second drive mode is displayed on a touch screen including the touch input device 1000 according to the embodiment of the present invention, and then the first drive mode and the second drive mode can be recognized according to the user's selective input.

Also, the controller 400 according to the first embodiment of the present invention may distinguish between the first drive mode and the second drive mode in accordance with the touch object on the touch sensor panel 100. Here, the object is referred to as a thing capable of changing the capacitance of the node capacitor 101 between the receiving electrode RX and the drive electrode TX included in the touch sensor panel 100 at the time of approaching and/or touching the touch sensor panel 100.

For example, a finger and a stylus pen can be used as the touch object. Here, the stylus pen is used to input a command to the touch screen and has a shape of a pencil. Generally, the touch area between the stylus pen and the touch sensor panel 100 is less and sharper than the touch area between the finger and the touch sensor panel 100. Therefore, the user is able to represent relatively more delicate movement by using the stylus pen on the touch sensor panel 100 than that by using the finger.

Therefore, when the user uses the stylus pen as the touch object, there may be a requirement for detecting the movement on the touch sensor panel 100 with relatively high resolution. Therefore, in the first embodiment of the present invention, when the touch object is the stylus pen, the touch input device 1000 may be caused to operate in the second drive mode. When the touch object is a finger, the touch input device 1000 may be caused to operate in the first drive mode. In the present specification, it is described as an example that the stylus pen is used as the object requiring high resolution and the finger is used as the object requiring relatively low resolution. However, it is clear that the first drive mode and the second drive mode according to the first embodiment of the present invention can be applied to any two touch objects having relatively different touch areas on the touch sensor panel 100.

The controller 400 according to the first embodiment of the present invention recognizes the object touching the touch sensor panel 100, and then may automatically determine whether the touch input device 1000 is operated in the first drive mode or second drive mode. For example, when the object starts touching the touch sensor panel 100, the touch input device 1000 may be driven by default setting. For example, the first drive mode or the second drive mode may be set as the default setting. Hereafter, it is described as an example that the second drive mode is set as the default setting.

During a period of time when the touch input device 1000 is driven in a default drive mode (the second drive mode) during a predetermined time after any object starts touching the touch sensor panel 100, the controller 400 is able to determine whether the object is suitable for the first drive mode or the second drive mode.

Then, the controller 400 is able to control the driving part 200 and the data processor 300 such that the touch input device 1000 is driven by the determined drive mode.

Here, the determination of whether the object is suitable for the first drive mode or the second drive mode may be made by considering a pitch between the drive electrodes TX, a pitch between the receiving electrodes RX and/or a pitch of the drive electrode operating in the first drive mode and the second drive mode and a pitch of the receiving electrode, and the like. Here, the pitch corresponds to a distance between two adjacent electrodes. Here, the distance may be obtained by measuring a distance between the middle points of the two electrodes.

For instance, the drive mode may be determined according to the size of a touch region between the touch object and the surface of the touch sensor panel 100. When it is assumed that the touch region between the touch object and the surface of the touch sensor panel 100 has a circular shape, the pitch between the drive electrodes (or receiving electrodes) to be driven may be set less than the diameter of the circle. While it is described that the touch region between the touch object and the surface of the touch sensor panel 100 has a circular shape, this is just an example, and the touch region between the touch object and the surface of the touch sensor panel 100 may have any shape. Here, the length of the longest straight line located inside any shape may function as the diameter. For example, when the touch region between the touch object and the surface of the touch sensor panel 100 has a quadrangular shape, the length of the diagonal line of the quadrangle can be used as the diameter.

It is assumed that the pitch between adjacent drive electrodes in the first drive electrode TX1 to the n-th drive electrode TXn is 1 mm and the first and second drive modes are the same as those of the above-described embodiment. When the touch region between the touch object and the surface of the touch sensor panel 100 has a circular shape with a diameter less than 2 mm, it may be determined that the touch input device 1000 is driven in the second drive mode. When the diameter is larger than 2 mm, it may be determined that the touch input device 1000 is driven in the first drive mode.

Under the same conditions, it is assumed that the drive mode includes a third drive mode as well as the first and second drive modes and only one of three adjacent drive electrodes TX is driven in the third drive mode. That is, the pitch between the drive electrodes (TX1, TX4, . . . ) which are driven in the third drive mode is 3 mm. Therefore, when the touch region between the touch object and the surface of the touch sensor panel 100 has a circular shape with a diameter larger than 3 mm, it may be determined that the touch input device 1000 is driven in the third drive mode. When the diameter is less than 3 mm and larger than 2 mm, it may be determined that the touch input device 1000 is driven in the first drive mode. When the diameter is less than 2 mm, it may be determined that the touch input device 1000 is driven in the second drive mode.

The controller 400 may control the drive mode to be selected such that the diameter of the touch region between the touch object and the touch sensor panel 100 is larger than the pitch between the drive electrodes to be driven and the driving signal is applied to a relatively smaller number of the drive electrodes. That is, when the diameter is less than 3 mm and larger than 2 mm, the condition that the diameter is less than the pitch in both of the first and second drive modes is satisfied. Here, the controller 400 controls such that the first drive mode in which a smaller number of the drive electrodes are used is selected.

The foregoing can be applied to the receiving electrode RX in the same manner.

Hereafter, another method of distinguishing the stylus pen from the finger will be described.

FIGS. 3a and 3b show a value of the capacitance change amount when the touch sensor panel is touched by the stylus pen in accordance with the embodiment of the present invention. FIGS. 4a and 4b show a value of the capacitance change amount when the touch sensor panel is touched by the finger in accordance with the embodiment of the present invention. FIGS. 3a to 4b include nine quadrangles arranged in the form of 3×3. Each quadrangle may be designated as a sensor cell included in the touch sensor panel. Each sensor cell may be formed at a crossing of one drive electrode TX and one receiving electrode RX. The sensor cells may have the same width. In FIGS. 3a to 4b, the nine sensor cells are the crossed area between the first drive electrode TX1 to third drive electrode TX3 and the first receiving electrode RX1 to third receiving electrode RX3, respectively.

Here, FIGS. 3a and 4a show one sensor cell with the maximum capacitance change amount within the touch sensor panel 100 respectively. FIGS. 3b and 4b show two or more sensor cell with the maximum capacitance change amount within the touch sensor panel 100 respectively.

The following Table 1 describes a method for distinguishing between the stylus pen and finger.

TABLE 1

|  | FIG. 3a | FIG. 3b | Threshold Value | FIG. 4a | FIG. 4b |
|---|---|---|---|---|---|
| a sum of capacitance change amount | 152 | 141 | 180 | 260 | 226 |
| the number of sensor cells of which the capacitance change amount is greater than 20 | 1 | 2 | 3 | 5 | 6 |
| the number of the sensor cells of which the capacitance change amount is greater than 25% of the maximum capacitance change amount | 0 (⟩ 25) | 1 (⟩ 12.5) | 3 | 4 (⟩ 25) | 5 (⟩ 12.5) |
| a sum of four upper capacitance change amounts/a sum of four lower capacitance change amounts | 10.8 (130/12) | 6.8 (116/17) | 6 | 4.75 (190/40) | 2.9 (150/51) |

For example, the controller 400 according to the embodiment of the present invention may distinguish between the first drive mode and the second drive mode by comparing a predetermined threshold value with at least any one of a sum of the capacitance change amount of each sensor cell within the touch sensor panel 100, the number of the sensor cells of which the capacitance change amount is greater than a predetermined capacitance change amount within the touch sensor panel, the number of the sensor cells of which the capacitance change amount is greater than a predetermined rate of the maximum capacitance change amount or minimum capacitance change amount within the touch sensor panel, and a ratio of a sum of a predetermined number of the upper capacitance change amounts to a sum of the predetermined number of the lower capacitance change amounts within the touch sensor panel.

Referring to FIGS. 3a, 3b, 4a and 4b and the table 1, the sums of the capacitance change amounts of respective sensor cells within the touch sensor panel 100 are compared with a threshold value. That is, when the sum of the capacitance change amount of the sensor cell within the touch sensor panel 100 is less than the threshold value of 180, it is determined that the touch object is the stylus pen. For example, as shown in FIG. 3a, the sum of the capacitance change amount of the sensor cell within the touch sensor panel 100 is 152 (=100+10+10+10+10+3+3+3+3), or as shown in FIG. 3b, the sum of the capacitance change amount of the sensor cell within the touch sensor panel 100 is 141. On the contrary to this, when the sum of the capacitance change amount of the sensor cell within the touch sensor panel 100 is greater than the threshold value, it is determined that the touch object is the finger. For example, as shown in FIG. 4a, the sum of the capacitance change amount of the sensor cell within the touch sensor panel 100 is 260, or as shown in FIG. 4b, the sum of the capacitance change amount of the sensor cell within the touch sensor panel 100 is 226.

The method for distinguishing between the stylus pen and finger is to compare a threshold value with the number of the sensor cells with the capacitance change amount greater than a predetermined capacitance change amount within the touch sensor panel 100. In other words, when a predetermined capacitance change amount is set to be 20, and when the number of the sensor cells with the capacitance change amount greater than 20 within the touch sensor panel 100 is less than the threshold value of 3, it is determined that the touch object is the stylus pen. For example, as shown in FIG. 3a, the number of the sensor cells with the capacitance change amount greater than 20 within the touch sensor panel 100 is 1 (100), or as shown in FIG. 3b, the number of the sensor cells with the capacitance change amount greater than 20 within the touch sensor panel 100 is 2 (50, 50). On the contrary to this, when the number of the sensor cells with the capacitance change amount greater than 20 within the touch sensor panel 100 is greater than the threshold value, it is determined that the touch object is the finger. For example, as shown in FIG. 4a, the number of the sensor cells with the capacitance change amount greater than 20 within the touch sensor panel 100 is 5, or as shown in FIG. 4b, the number of the sensor cells with the capacitance change amount greater than 20 within the touch sensor panel 100 is 6.

Also, the method for distinguishing between the stylus pen and finger is to compare a threshold value with the number of the sensor cells of which the capacitance change amount is greater than a predetermined rate of the maximum capacitance change amount or minimum capacitance change amount within the touch sensor panel 100. In other words, when the predetermined rate is set to be 25%, and when the number of the sensor cells of which the capacitance change amount is greater than 25% of the maximum capacitance change amount within the touch sensor panel 100 is less than the threshold value of 3, it is determined that the touch object is the stylus pen. For example, as shown in FIG. 3a, the number of the sensor cells of which the capacitance change amount is greater than 25% of the maximum capacitance change amount within the touch sensor panel 100 is 0, or as shown in FIG. 3b, the number of the sensor cells of which the capacitance change amount is greater than 25% of the maximum capacitance change amount within the touch sensor panel 100 is 1 (50). On the contrary to this, when the number of the sensor cells of which the capacitance change amount is greater than 25% of the maximum capacitance change amount within the touch sensor panel 100 is greater than the threshold value, it is determined that the touch object is the finger. For example, as shown in FIG. 4a, the number of the sensor cells of which the capacitance change amount is greater than 25% of the maximum capacitance change amount within the touch sensor panel 100 is 4, or as shown in FIG. 4b, the number of the sensor cells of which the capacitance change amount is greater than 25% of the maximum capacitance change amount within the touch sensor panel 100 is 5.

Also, the method for distinguishing between the stylus pen and finger is to compare a threshold value with a ratio of a sum of a predetermined number of the upper capacitance change amounts to a sum of the predetermined number of the lower capacitance change amounts within the touch sensor panel 100. In other words, when the predetermined number is set to be 4, and when the ratio of the sum of four upper capacitance change amounts within the touch sensor panel 100 to the sum of four lower capacitance change amounts within the touch sensor panel 100 is greater than the threshold value of 6, it is determined that the touch object is the stylus pen. For example, as shown in FIG. 3a, the ratio is 10.8 (=130÷12), or as shown in FIG. 3b, the ratio is 6.8 (=116÷17). On the contrary to this, when the ratio of the sum of four upper capacitance change amounts within the touch sensor panel 100 to the sum of four lower capacitance change amounts within the touch sensor panel 100 is less than the threshold value, it is determined that the touch object is the finger. For example, as shown in FIG. 4a, the ratio is 4.75 (=190÷40), or as shown in FIG. 4b, the ratio is 2.9(=150÷51).

The threshold value of each of the methods may be adjusted so as to distinguish the touch objects through an experiment or in accordance with the embodiment. That is, in the foregoing, the first drive mode and the second drive mode can be determined by distinguishing between the finger and stylus pen. However, it is possible to apply other threshold and method for distinguishing touch objects in order to distinguish touch objects that have any other touch areas According to a second embodiment of the present invention, in the first drive mode requiring relatively low resolution, the controller 400 may control the driving part 200 to apply the driving signal such that at least two of n number of the drive electrodes TX1 to TXn are simultaneously driven. According to the second embodiment of the present invention, in the first drive mode, when each scan is performed, the driving signal is applied to n number of the drive electrodes TX1 to TXn. In addition, the driving signal may be applied simultaneously to two or more drive electrodes.

A case where the driving signal is applied to two drive electrodes at the same time is taken as an example. When each scan is performed, the driving signal is applied to n number of the drive electrodes and the same driving signal is simultaneously applied to two drive electrodes at a time. For example, in a first time interval, the first and second switches ST1 and ST2 are closed and the same driving signal is applied to the first and second drive electrodes TX1 and TX2 at the same time. Subsequently, in a second time interval, the third and fourth switches ST3 and ST4 are closed and the same driving signal is applied to the third and fourth drive electrodes TX3 and TX4 at the same time. According to the sequential application of the driving signal, in the last time interval, the (n–1)-th and n-th switches STn–1 and STn are closed and the same driving signal is applied to the (n–1)-th and n-th drive electrodes TXn–1 and TXn at the same time. Such a scanning process may be repeated. Here, the number of the drive electrodes to which the driving signal is simultaneously applied in one time interval may be changed according to the embodiment. According to the embodiment, at least two drive electrodes (e.g., TX1 and TX2) to which the driving signal is simultaneously applied may receive the corresponding driving signal from one driving circuit.

Likewise, according to the second embodiment of the present invention, in the first drive mode, the controller 400 may control such that the data processor 300 receives simultaneously the signals from at least two of m number of the receiving electrodes RX1 to RXm and detects the touch information. In the first drive mode according to the second embodiment of the present invention, although, when each scan is performed, the data processor 300 receives the signal from m number of the receiving electrodes RX1 to RXm, it is also possible for the data processor 300 to receive simultaneously the signals from two or more receiving electrodes.

A case where the driving signal is received simultaneously from two receiving electrodes is taken as an example. When each scan is performed, the data processor 300 may receive the signals from m number of the receiving electrodes and may receive and process the signals from two receiving electrodes at a time. For example, in the first time interval, the first and second switches SR1 and SR2 are closed and the signal is received simultaneously by the data processor 300 from the first and second receiving electrodes RX1 and RX2 and then is processed by the data processor 300. Subsequently, in the second time interval, the third and fourth switches SR3 and SR4 are closed and the signal is received simultaneously by the data processor 300 from the third and fourth receiving electrodes RX3 and RX4 and then is processed by the data processor 300. According to the sequential signal processing, in the last time interval, the (m–1)-th and m-th switches SRm–1 and SRm are closed and the signal is received simultaneously by the data processor 300 from the (m–1)-th and m-th receiving electrodes RXm–1 and RXm and then is processed by the data processor 300. Such a scanning process may be repeated. Here, the number of the receiving electrodes which simultaneously receive the signal in one time interval may be changed according to the embodiment. According to the embodiment, regarding at least two receiving electrodes which simultaneously receive the signal, one data processing unit 300m may receive the corresponding signal and may process the data.

The second embodiment of the present invention is the same as the first embodiment of the present invention, except for the combination of the drive electrodes which are driven in the first drive mode and the combination of the receiving electrodes receiving the signal. The repetitive descriptions will be omitted.

When the touch input device 1000 is operated in the first drive mode according to the second embodiment of the present invention, a time required for each scan can be reduced, for example, to a half or less, so that the reporting rate at which the touch information is obtained by the touch input device 1000 can be increased. According to the embodiment, when, in the first drive mode, the drive electrodes which are driven simultaneously share the driving circuit, and/or when, in the first drive mode, the receiving electrodes receiving simultaneously the signal share the data processing unit 300m, the power consumption can be reduced compared with that of the second drive mode.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch input device comprising:
a touch sensor panel comprising n number of drive electrodes, m number of receiving electrodes, and a plurality of node capacitors which are formed by the drive electrodes and the receiving electrodes;
a driving part which applies a driving signal to the drive electrodes;
a data processor which receives signals including information on capacitances of the plurality of node capacitors through the receiving electrodes and detects touch information on the touch sensor panel; and
a controller having a first drive mode and a second drive mode, the first drive mode enabling the detection of touch information that is lower in resolution than when the controller is in the second drive mode;
wherein, in the first drive mode, the controller enables the detection of the lower resolution touch information by controlling the driving part to apply the driving signal to k number of the drive electrodes;
wherein, in the second drive mode, the controller controls the driving part to apply the driving signal to n number of the drive electrodes and controls the data processor to receive the signal through m number of the receiving electrodes and to detect the touch information; and
wherein the "n", "m", and "k" are natural numbers greater than 2 and "k" is less than "n".

2. The touch input device of claim 1, wherein the controller controls the data processor to receive the signal through s number of the receiving electrodes of m number of the receiving electrodes and to detect the touch information in the first drive mode, wherein the "s" is a natural number greater than 2 and less than "m".

3. The touch input device of claim 2, wherein two adjacent receiving electrodes of s number of the receiving electrodes are spaced from each other and at least one of the other receiving electrodes except for s number of the receiving electrodes of m number of the receiving electrodes is placed between the two receiving adjacent electrodes.

4. The touch input device of claim 2, wherein the "s" has a value of m/2.

5. The touch input device of claim 1, wherein two adjacent drive electrodes of k number of the drive electrodes are spaced from each other and at least one of the other drive electrodes except for k number of the drive electrodes of n number of the drive electrodes is placed between the two adjacent drive electrodes.

6. The touch input device of claim 1, wherein the "k" has a value of n/2.

7. The touch input device of claim 1, wherein the controller controls either the first drive mode or the second drive mode to be selected through a selective input to the touch input device.

8. The touch input device of claim 1, wherein the controller controls either the first drive mode or the second drive mode to be selected in accordance with a touch object on the touch sensor panel.

9. The touch input device of claim 8, wherein the controller distinguishes between the first drive mode and the second drive mode by comparing a predetermined threshold value with at least any one of a sum of the capacitance change amount of each sensor cell within the touch sensor panel, the number of the sensor cells of which the capacitance change amount is greater than a predetermined capacitance change amount within the touch sensor panel, the number of the sensor cells of which the capacitance change amount is greater than a predetermined rate of the maximum capacitance change amount or minimum capacitance change amount within the touch sensor panel, and a ratio of a sum of a predetermined number of the upper capacitance change amounts to a sum of the predetermined number of the lower capacitance change amounts within the touch sensor panel.

10. The touch input device of claim 8, wherein the touch object is finger in the first drive mode and is a stylus pen in the second drive mode.

11. The touch input device of claim 1, wherein the controller controls either the first drive mode or the second drive mode to be selected such that a diameter of a touch region between a touch object and the touch sensor panel is larger than a pitch between the drive electrodes to be driven or a pitch between the receiving electrodes to be used to detect the touch information and a relatively smaller number of the drive electrodes or receiving electrodes are used.

12. The touch input device of claim 1, further comprising n number of switches connected between the controller and each of n number of the drive electrodes, wherein, in the first drive mode, k number of the switches of n number of the switches connected between the controller and k number of the drive electrodes are in a closed state and the other switches of n number of the switches connected between the controller and the other drive electrodes except for k number of the drive electrodes of n number of the drive electrodes are in an open state.

13. The touch input device of claim 1 wherein a single touch event is detected using only one of the first drive mode and the second drive mode.

14. A touch input device comprising:
a touch sensor panel comprising n number of drive electrodes, m number of receiving electrodes, and a plurality of node capacitors which are formed by the drive electrodes and the receiving electrodes;
a driving part which applies a driving signal to the drive electrode;
a data processor which receives signals including information on capacitances of the plurality of node capacitors through the receiving electrodes and detects touch information on the touch sensor panel; and a controller having a first drive mode and a second drive mode, the first drive mode enabling the detection of touch information that is lower in resolution than when the controller is in the second drive mode;

wherein, in the first drive mode, the controller enables the detection of the lower resolution touch information by controlling the data processor to receive the signals through s number of the receiving electrodes;

wherein, in the second drive mode, the controller controls the driving part to apply the driving signal to n number of the drive electrodes and controls the data processor to receive the signal through m number of the receiving electrodes and to detect the touch information; and wherein the "n", "m", and "s" are natural numbers greater than 2 and "s" is less than "m".

15. The touch input device of claim 14, wherein the controller controls the driving part to apply the driving signal to k number of the drive electrodes of n number of the drive electrodes in the first drive mode, wherein the "k" is a natural number greater than 2 and less than "n".

16. The touch input device of claim 14, wherein two adjacent receiving electrodes of s number of the receiving electrodes are spaced from each other and at least one of the other receiving electrodes except for s number of the receiving electrodes of m number of the receiving electrodes is placed between the two adjacent drive electrodes.

17. The touch input device of claim 14, further comprising m number of switches connected between the controller and each of m number of the receiving electrodes, wherein, in the first drive mode, s number of the switches of m number of the switches connected between the controller and s number of the receiving electrodes are in a closed state and the other switches of m number of the switches connected between the controller and the other receiving electrodes except for s number of the receiving electrodes of m number of the receiving electrodes are in an open state.

18. The touch input device of claim 14, further comprising a third drive mode, wherein in the third drive mode only one of three adjacent drive electrodes is driven by the controller.

\* \* \* \* \*